(12) United States Patent
Kohlmeier et al.

(10) Patent No.: US 6,290,048 B1
(45) Date of Patent: Sep. 18, 2001

(54) WHEEL HUB WITH INTEGRAL PLANETARY GEAR MECHANISM AND MULTIDISK BRAKE

(75) Inventors: Dietmar Kohlmeier, Dortmund; Andreas Meise, Bochum; Friedrich Wolff, Wetter, all of (DE)

(73) Assignee: O&K Orenstein & Koppel Aktiengesellschaft, Dortmund (DE)

( * ) Notice: Subject to any disclaimer, the term of this patent is extended or adjusted under 35 U.S.C. 154(b) by 0 days.

(21) Appl. No.: 09/637,982

(22) Filed: Aug. 11, 2000

Related U.S. Application Data

(63) Continuation of application No. PCT/EP98/08114, filed on Dec. 12, 1998.

(30) Foreign Application Priority Data

Feb. 13, 1998 (DE) .............................................. 198 05 881

(51) Int. Cl.⁷ .................................................. B60K 41/26
(52) U.S. Cl. ...................................... 192/221.1; 475/323
(58) Field of Search ........................ 192/221.1; 475/323; 180/369

(56) References Cited

U.S. PATENT DOCUMENTS 4,407,382 * 10/1983 Dziuba et al. ........................ 180/10
6,135,259 * 10/2000 Forster .............................. 192/221.1

FOREIGN PATENT DOCUMENTS

| 3832649 | 7/1989 | (DE) . |
| 4439360 | 1/1996 | (DE) . |
| 196 40 146 | * 1/1998 | (DE) . |
| 2 514 091 | * 4/1983 | (FR) . |
| 900326 | 7/1962 | (GB) . |
| 1595713 | 8/1981 | (GB) . |

* cited by examiner

Primary Examiner—Rodney H. Bonck
(74) Attorney, Agent, or Firm—Rosenman & Colin, LLP

(57) ABSTRACT

A wheel hub with integral planetary gear mechanism and multidisk brake, in which the outer plates of the brake are actively connected directly to the wheel hub and the inner plates are connected to the axle body via a brake carrier, is to be of simple design and easy to install and to be of small structure. According to the invention, the brake carrier (1,19,20), together with the brake piston (2) and its seals (3,4), the brake plates (5,6), a brake support ring (7) and the integral gear (8) being attached to this first installation assembly (M1) and the brake carrier (1) having an internally arranged attachment flange (17) which can be connected to the axle body (10) via attachment elements (14) for attaching the entire first installation assembly (M1), and that the cup-shaped wheel hub (9), together with the planet gears (12) and their bearings (18), is designed as a second installation assembly (M2), this second installation assembly (M2) being designed in such a manner that it can be pushed over the first installation assembly (M1).

8 Claims, 5 Drawing Sheets

Figure 1:
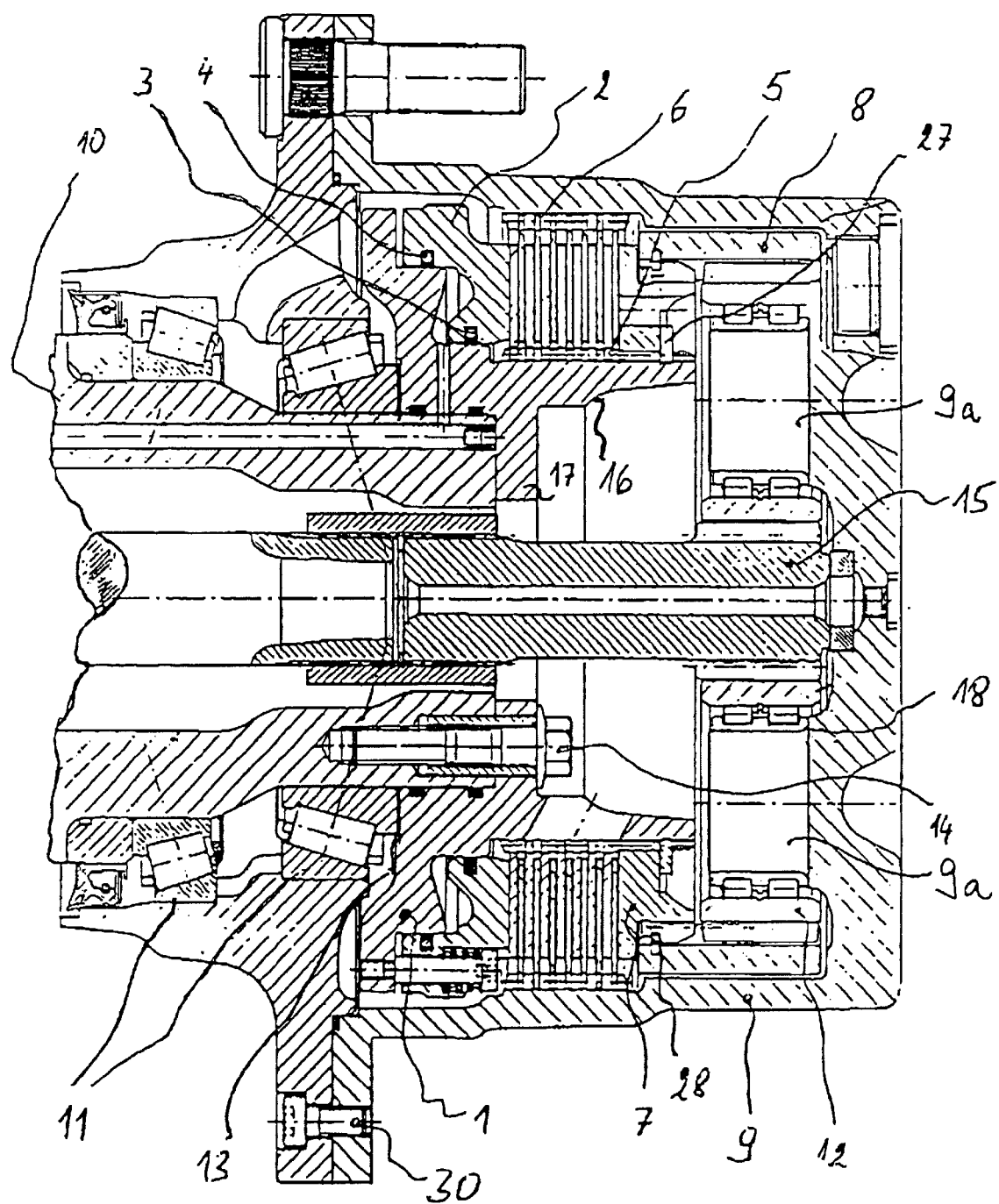

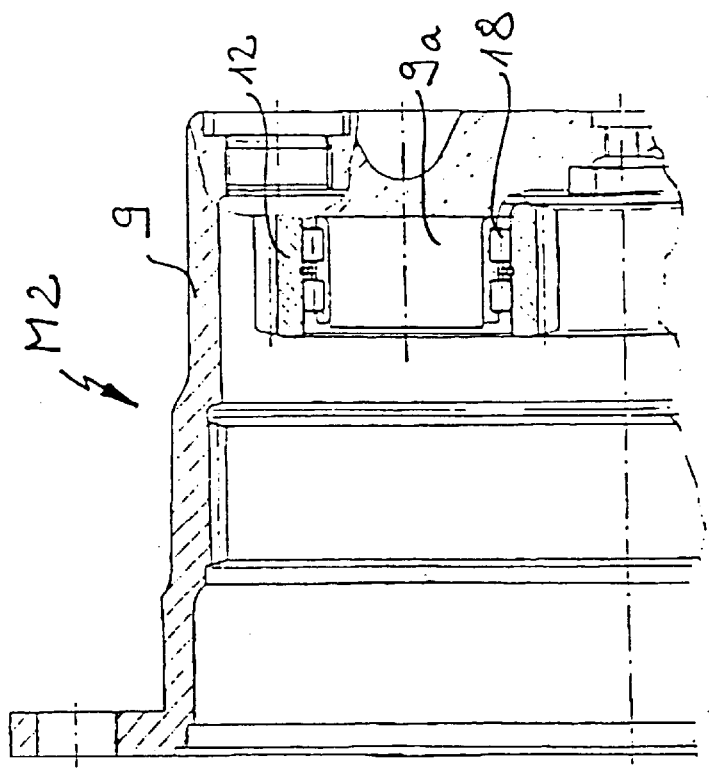
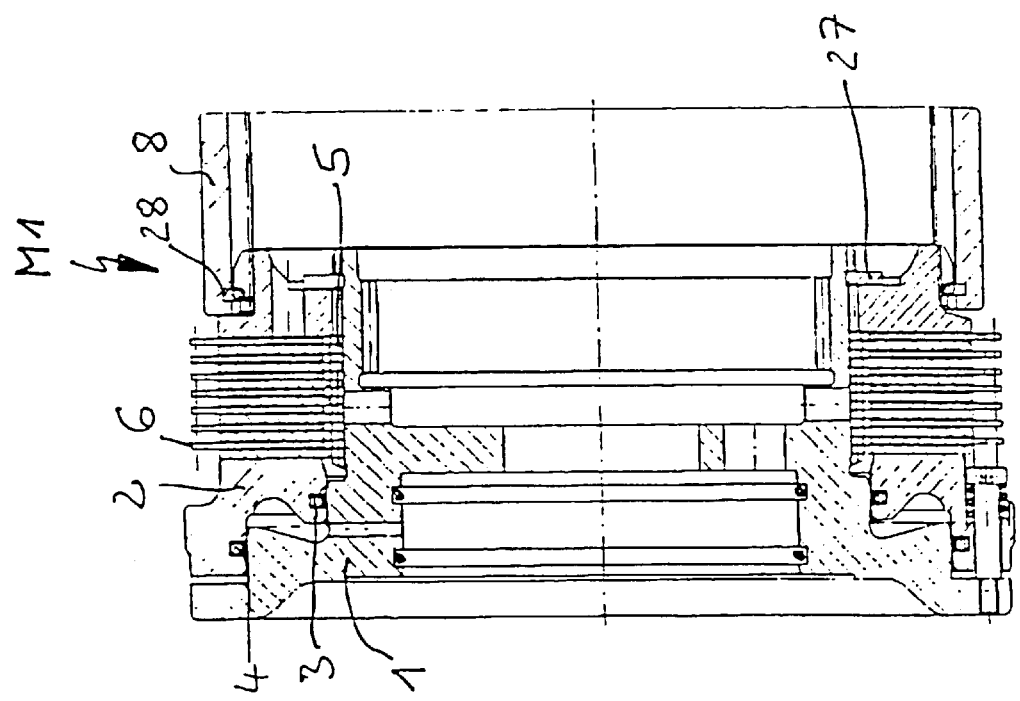

WHEEL HUB WITH INTEGRAL PLANETARY GEAR MECHANISM AND MULTIDISK BRAKE

This application is a continuation of international application number PCT/EP98/08114, filed Dec. 12, 1998 which is pending.

The invention relates to a wheel hub with integral planetary gear mechanism and multidisk brake, the outer plates of the brake being actively connected directly to the wheel hub, and the inner plates being connected to the axle body via a brake carrier, the planetary gear mechanism comprising a pinion, a planet carrier with planet gears held thereon, and an internal gear.

In wheel hubs with an integral multidisk brake and an integral planetary gear mechanism, which are used in particular for machine tools and construction machines, with regard to the arrangement of the brake there are designs in which the brake connects a component of the planetary gear mechanism to the fixed support body or clamps it to another transmission shaft (DE 44 39 360 A1 and U.S. Pat. No. 4,317,498). A drawback of these designs is that the wheel hub is not braked in an absolutely fixed position, but rather may execute a movement as a function of the magnitude of the play in the transmission.

DE 38 32 649 A1 and DE 196 40 146 C1, belonging to the present applicant, have disclosed wheel hub designs of the generic type in which the brake connects the output hub to the support body and thus fixes the output without play. DE 38 32 649 A1 shows an example of this design, but this too has a number of drawbacks. Specifically, this known wheel hub has a high design complexity and a large number of components and, consequently, is difficult to assemble. Moreover, it is of great structural length. A further significant drawback is the difficulty of access to the plates of the brake, since they are positioned between the bearings. However, in the case of vehicles it is imperative to have easy access to the plates, so that the wear levels of the brake can be determined easily. A further drawback is that the brake support plate and the internal gear carrier are two different components.

The solution described in DE 196 40 146 C1 substantially avoids the above drawbacks. However, a drawback of this solution is that the internal gear at the same time forms the wheel hub, and there can be no load balancing in the planetary gear mechanism via the internal gear. It is known that in planetary gear mechanisms the torques are distributed over a plurality of planet carriers. If, in this case, two adjacent transmission members (sun/planet; planet/internal gear) are fixed radially, depending on the position of the gears the torques will be distributed differently between these gears. Furthermore, this design provides for difficult access to the plates and seals and, due to the structure of the internal gear output, a relatively small planetary step-up ratio.

The object of the invention is to avoid the abovementioned drawbacks and to provide a less expensive wheel hub with a direct multidisk brake and planetary gear mechanism so that it is of simple structure and easy to fit, a small size being desired which, at the same time, by means of a web output from the planetary gear mechanism, allows a large step-up ratio and, if appropriate, a two-stage planetary gear mechanism within the intended space.

With a wheel hub of the type described in the introduction, this object is achieved, according to the invention, by the fact that the brake carrier, together with the brake piston and its seals, the brake plates, a brake support ring and the internal gear, is designed as a first installation assembly, the internal gear being attached to this first installation assembly and the brake carrier having an internally arranged attachment flange which can be connected to the axle body via attachment elements for attaching the entire first installation assembly, and that the cup-shaped wheel hub, together with the planet gears and their bearings, is designed as a second installation assembly, this second installation assembly being designed in such a manner that it can be pushed over the first installation assembly, the cup-shaped wheel hub engaging in the outer plates of the brake.

It can be seen that this division of the wheel hub into two installation assemblies produces a wheel hub which is of simple structure and is easy to assemble, so that in particular there is also very good access to the plates of the brake, so that it is easy to establish the wear levels thereof. Moreover, in the design according to the invention, the sun pinion and the internal gear are mounted in such a manner that they can move in the radial direction to a limited extent. If, by way of example, one planetary gear were now to generate a greater moment than the other, the gearing forces would displace the internal gear and the sun pinion toward the planets which are under less load, so that the latter would take up a greater moment. This measure allows four or more planet gears to be used to good effect.

As can be seen, the wheel hub is particularly simple to assemble, and after the first installation assembly (brake carrier assembly) has been assembled, the second installation assembly can be fitted easily by being pushed over the first installation assembly with the wheel hub and then being attached. Dismantling can be carried out in the reverse order. The wheel hub as a whole therefore essentially comprises just two separate assemblies.

In an advantageous configuration, the internal gear is attached to the brake support ring, for example by means of a securing ring.

Furthermore, to form the second installation assembly, the planet carrier is formed by the bearing journal of the wheel hub, on which the planet gears are arranged.

In a further advantageous configuration, the brake carrier has a cup-shaped internal contour. As a result, there is additional space available inside the brake carrier.

This additional space can be used to particularly good effect by arranging a second planetary gear mechanism inside the cup-shaped internal contour of the brake carrier, the brake carrier forming the toothing of the internal gear of the second planetary gear mechanism. It is thus possible to produce a two-stage planetary gear mechanism within a given space without any problems.

As an alternative, it is also possible for the brake carrier, as its internal contour, to have only a single hole for installing the pinion.

To further simplify assembly, it is advantageous for the seals of the step-like brake piston to be arranged in circumferential grooves in the brake piston. This makes the seals simple to fit without any auxiliary tools being required.

Furthermore, assembly of the wheel hub can be simplified still further by making it possible to clamp the wheel bearings by means of the brake carrier via adjustment disks. It is then possible, in a simple manner, also to adjust the wheel bearings when assembling the first installation assembly containing the brake carrier.

Figure 2:
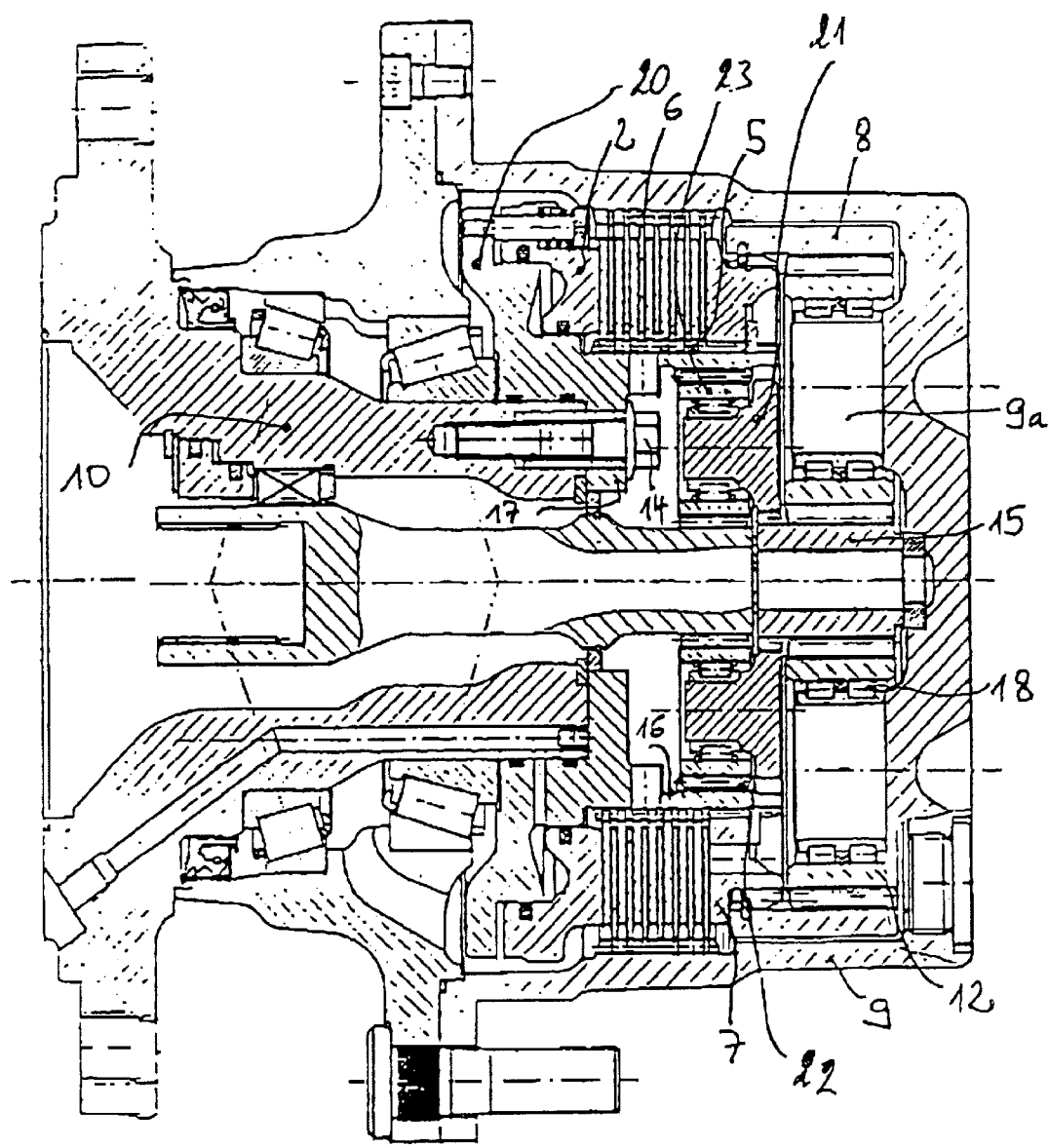
Figure 3:
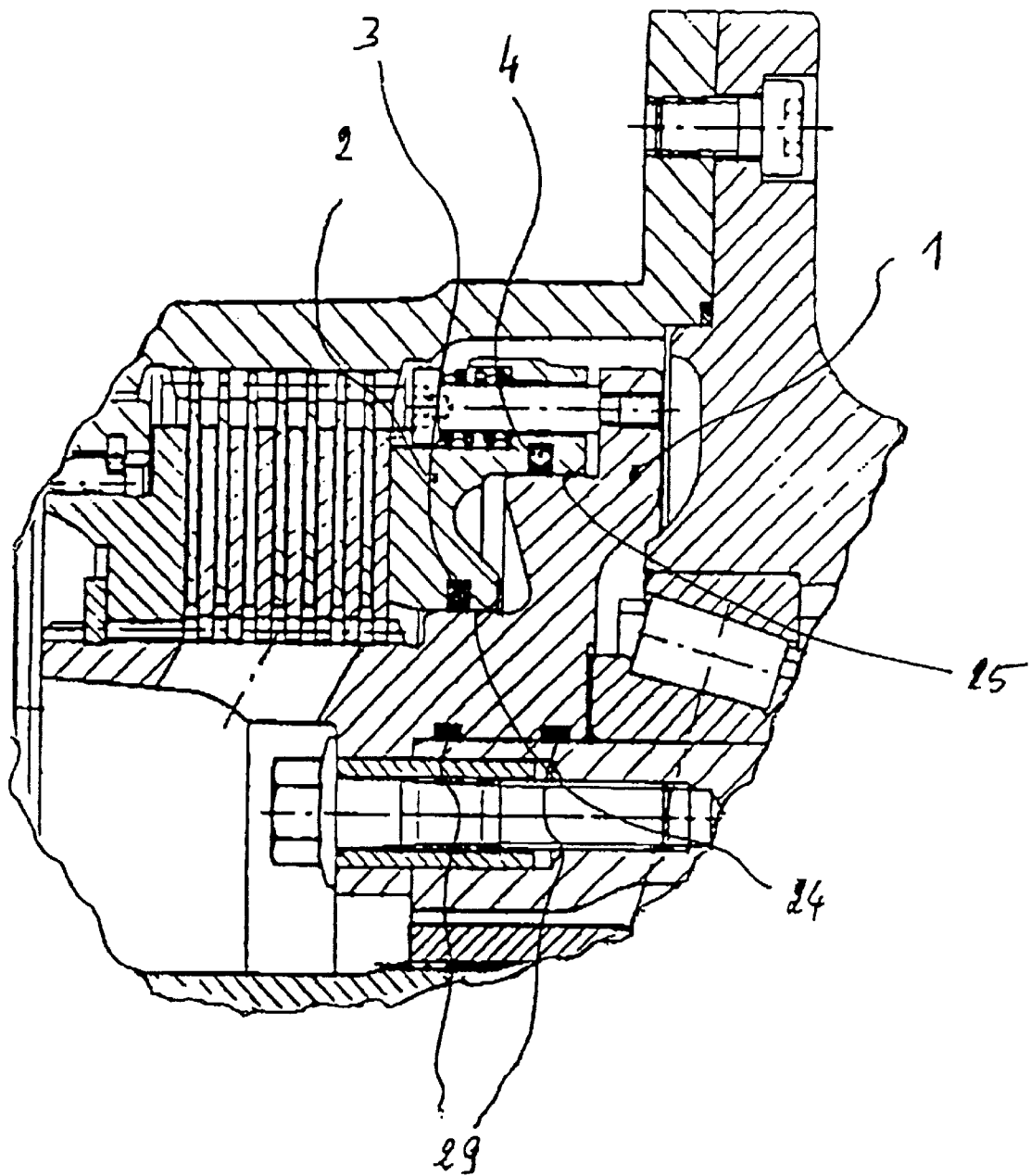
Figure 4:
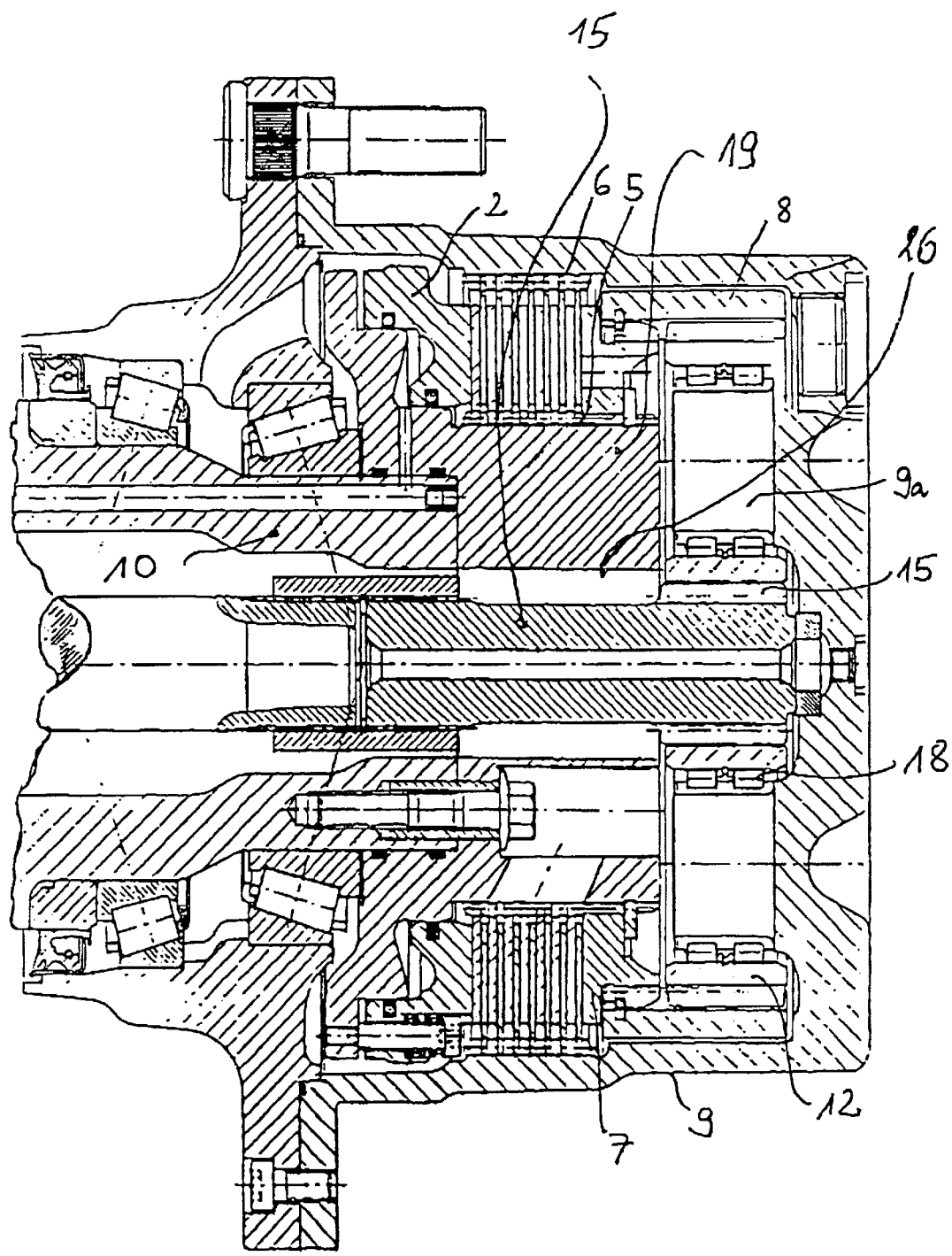

The invention is explained in more detail below, by way of example, with reference to the drawing, in which:

FIG. 1 shows a first embodiment of a wheel hub according to the invention, in section, with a one-stage planetary gear mechanism, FIG. 2 shows a second embodiment, likewise in section, with a two-stage planetary gear mechanism, FIG. 3 shows an advantageous design of the brake piston, FIG. 4 shows a further configuration of a wheel hub according to the invention, and FIG. 5 shows an exploded view of the first and second installation assemblies of the wheel hub shown in FIG. 1.

FIG. 1 illustrates a first embodiment of a wheel hub 9 with an integral planetary gear mechanism and a directly acting multidisk brake. The wheel hub 9 is intended for an axle (axle carrier 10) which is only diagrammatically depicted and may, for example, be used in a wheel loader or mobile excavator (not shown in more detail).

The wheel hub 9 has a planetary gear mechanism which includes a sun pinion 15, planet gears 12 and an internal gear 8. The planet gears 12 are arranged on a planet carrier which is formed by bearing journals 9a of the wheel hub 9. The internal gear 8 is in this case designed as a fixed transmission member.

The wheel hub 9 has a brake which acts directly on the wheel hub 9. For this purpose, the brake includes a brake carrier 1 which is centered on the axle body 10. This brake carrier 1 has a cup-shaped internal contour 16 and an inner flange 17 which is used to attach the brake carrier 1 to the axle body 10. For this purpose, attachment means 14, preferably attachment screws, are provided.

A brake piston 2, which is sealed by brake piston seals 3 and 4, is arranged movably on the brake carrier 1. The brake piston 2 presses the inner plates 5 or the outer plates 6 of the brake against a brake support ring 7 when pressure is applied and thus generates a braking moment which decelerates the wheel hub 9. The inner plates 5 are connected to the axle body 10 via the brake carrier 1, while the outer plates 6 are actively connected directly to the wheel hub 9.

The brake support ring 7 has external toothing which supports the internal gear 8 of the planetary gear mechanism.

Together with the brake piston 2, its seals 3, 4, the brake plates 5, 6, the brake support ring 7 and the internal gear 8, the brake carrier 1 forms a first installation assembly, which is illustrated as an individual part in FIG. 5 and is denoted by M1. In this assembly, the internal gear 8 is attached to the brake support ring 7; for this purpose a securing ring 28, for example, is provided. The brake support ring 7 is for its part attached to the brake carrier 1 by means of a securing ring 27.

The bearing journals 9a of the wheel hub 9, which form the planet carrier, accommodate bearings 18, by means of which the planet gears 12 are supported. The cup-shaped wheel hub 9, together with the planet gears 12 and their bearings 18, forms a second installation assembly, which is illustrated as an individual part in FIG. 5 and in that figure is denoted by M2.

This type of design of the wheel hub 9, divided into two installation assemblies or installation modules M1, M2, allows the planetary gear mechanism and the brake to be designed separately from one another. This allows economic production and assembly and simple dismantling in order to repair the brake.

Assembly is carried out as follows: the brake carrier 1 is provided with the brake piston 2 and the seals 3, 4 before it is fitted to the axle body 10, and then the brake plates 5 and 6 are pushed on and the brake support ring 7 is attached to the brake carrier 1 by the securing ring 27. Then, the internal gear 8 is connected to the brake support ring 7 by means of the securing ring 28. The first installation assembly M1 which is formed in this way, after seals 29 have been inserted, is pushed onto the axle carrier 10 and is connected using the attachment screws 14. At the same time, the wheel bearings 11 are prestressed by means of adjustment disks 13.

Then, the second installation assembly M2, which comprises the wheel hub 9, the planet gears 12 and the bearings 18, is pushed over the first installation assembly M1 and is attached by means of auxiliary screws 30.

Dismantling is to be carried out in the reverse order, and after the wheel hub 9 with planet gears 12 and bearings 18 has been removed the plates 5, 6 of the brake are readily accessible for inspection purposes.

FIG. 2 shows a further embodiment of a wheel hub according to the invention, in which, with the exception of the reference numeral for the brake carrier, the same reference numerals as those given in FIG. 1 are used. In this embodiment, the brake carrier is denoted by 20. In this embodiment, the cup-shaped internal contour 16 of the brake carrier 20 is provided with internal toothing which forms the internal gear for a second planetary gear mechanism 21. This internal toothing is denoted by 22. The planet gears of the second planetary gear mechanism 21 are denoted by 23 and engage in the internal toothing 22. It can be seen that, due to the internal contour 16 of the brake carrier 20, it is thus possible to produce a second planetary stage in a simple manner and within a given space.

FIG. 3 shows an enlarged detail of the embodiment shown in FIG. 1, namely an advantageous configuration of the brake piston 2. In this configuration, the brake piston 2 is provided with an inner circumferential groove 24 and an outer circumferential groove 25, which are used to hold the seals 3, 4 and therefore allow easy fitting of the seals without the need for any auxiliary tools.

FIG. 4 illustrates a further embodiment of a wheel hub according to the invention. In this case too, the same reference numerals as in the previous figures are used, where they relate to the same parts, with the exception of the brake carrier, which in this embodiment is denoted by 19. This brake carrier 19 does not have a cup-shaped internal contour, but rather its internal contour is designed simply as a hole 26 which allows the pinion 15 of the single planetary gear mechanism of this embodiment to be installed.

FIG. 5 illustrates, as mentioned above, the two installation assemblies, namely the brake carrier assembly M1 and the wheel hub assembly M2, in order to illustrate the simple way in which the wheel hub according to the invention can be assembled and, if appropriate, dismantled.

Naturally, the invention is not limited to the exemplary embodiments illustrated. Further designs are possible without departing from the basic principle of the invention.

What is claimed is:

1. A wheel hub with integral planetary gear mechanism and multidisk brake, outer plates of the brake being actively connected directly to the wheel hub, and inner plates being connected to an axle body via a brake carrier, the planetary gear mechanism comprising a pinion, a planet carrier with planet gears held thereon, and an internal gear, wherein the brake carrier (1,19,20), together with a brake piston (2) and seals (3,4), the brake plates (5,6), a brake support ring (7) and the internal gear (8), is designed as a first installation assembly (M1), the internal gear (8) being attached to this first installation assembly (M1) and the brake carrier (1) having an internally arranged attachment flange (17) which can be connected to the axle body (10) via attachment elements (14) for attaching the entire first installation assembly (M1), and wherein a cup-shaped wheel hub (9), together with the planet gears (12) and bearings (18), is designed as a second installation assembly (M2), this second installation assembly (M2) being designed in such a manner that it can be pushed over the first installation assembly (M1), the cup-shaped wheel hub (9) engaging in the outer plates (6) of the brake.

2. The wheel hub as claimed in claim 1, wherein the internal gear (8) is attached to the brake support ring (7).

3. The wheel hub as claimed in claim 1, wherein the planet carrier is formed by bearing journals (9a) of the wheel hub (9).

4. The wheel hub as claimed in claim 1, wherein the brake carrier (1, 20) has a cup-shaped internal contour (16).

5. The wheel hub as claimed in claim 4, wherein a second planetary gear mechanism (21) is arranged inside the cup-shaped internal contour (16) of the brake carrier (20), the brake carrier forming the toothing of an internal gear (22) of the second planetary gear mechanism (21).

6. The wheel hub as claimed in claim 1, wherein the brake carrier (9), as its internal contour, has only a single hole (26) for installing the pinion.

7. The wheel hub as claimed in claim 1, wherein the seals (3,4) of a step-like brake piston (2) are arranged in circumferential grooves (24, 25) in the brake piston (2).

8. The wheel hub as claimed in claim 1, wherein wheel bearings (11) can be clamped by means of the brake carrier (1,19,20) via adjustment disks (13).

* * * * *